US012804380B2

(12) United States Patent
Gupta

(10) Patent No.: US 12,804,380 B2
(45) Date of Patent: Nov. 17, 2026

(54) SYSTEMS AND METHODS ENABLING SEAMLESS SIM PROFILE TRANSMISSION AT SUBSCRIPTION MANAGEMENT DATA PREPARATION (SMDP+)

(71) Applicant: Rakuten Symphony, Inc., Tokyo (JP)

(72) Inventor: Ashutosh Gupta, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 492 days.

(21) Appl. No.: 18/013,778

(22) PCT Filed: Sep. 29, 2022

(86) PCT No.: PCT/US2022/045142
§ 371 (c)(1),
(2) Date: Dec. 29, 2022

(87) PCT Pub. No.: WO2024/072387
PCT Pub. Date: Apr. 4, 2024

(65) Prior Publication Data
US 2024/0251230 A1 Jul. 25, 2024

(51) Int. Cl.
*H04W 88/06* (2009.01)
*H04W 8/18* (2009.01)
*H04W 8/24* (2009.01)

(52) U.S. Cl.
CPC ............. *H04W 8/183* (2013.01); *H04W 8/24* (2013.01); *H04W 88/06* (2013.01)

(58) Field of Classification Search
CPC ........ H04W 88/06; H04W 8/205; H04W 8/18
See application file for complete search history.

(56) References Cited

U.S. PATENT DOCUMENTS

2019/0253563 A1* 8/2019 Ullah .................. H04M 15/888
2020/0120494 A1* 4/2020 Fares .................... H04W 12/35
2021/0006964 A1* 1/2021 Lee ....................... H04W 8/205
2021/0160683 A1* 5/2021 Li ......................... H04W 12/72
(Continued)

FOREIGN PATENT DOCUMENTS

CN 113055857 A 6/2021
EP 3 873 119 A1 9/2021
(Continued)

OTHER PUBLICATIONS

International Search Report issued Mar. 20, 2023 in International Application No. PCT/US22/45142.
(Continued)

*Primary Examiner* — Barry W Taylor
(74) *Attorney, Agent, or Firm* — Sughrue Mion, PLLC

(57) ABSTRACT

Systems and methods for providing a network profile for an Embedded Universal Integrated Circuit Card (eUICC) include generating a first profile corresponding to a first communication protocol, generating a second profile corresponding to a second communication protocol, associating the first profile and the second profile with a same profile record, and providing either the first profile or the second profile to a user device based on a determined communication protocol, from among the first communication protocol and the second communication protocol, to be used by the user device.

20 Claims, 12 Drawing Sheets

(56) References Cited

U.S. PATENT DOCUMENTS

| | | | | |
|---|---|---|---|---|
| 2021/0243591 | A1 | 8/2021 | Caserta | |
| 2022/0326959 | A1* | 10/2022 | Lee | G06F 8/61 |
| 2024/0365106 | A1* | 10/2024 | Nitsch | H04W 8/20 |

FOREIGN PATENT DOCUMENTS

| | | | |
|---|---|---|---|
| WO | 2019/184658 | * | 10/2019 |
| WO | 2019/184658 | A1 | 10/2019 |

OTHER PUBLICATIONS

Written Opinion issued Mar. 20, 2023 in International Application No. PCT/US22/45142.

* cited by examiner

202

Profile Inventory (Database)

| MSISDN | ICCID | IMSI | Profile State (enable/ disable /delete) | Protected Profile 4G | Protected Profile 5G |
|---|---|---|---|---|---|
| xxxxx123456 | xxxxxxx1234 | xxxxx56798 | enable | 010101001 010100101 01001000 | 010100101 001010101 01001010 |
| | | | | | |
| | | | | | |
| | | | | | |
| | | | | | |
| | | | | | |

FIG. 2(Continue...)

SYSTEMS AND METHODS ENABLING SEAMLESS SIM PROFILE TRANSMISSION AT SUBSCRIPTION MANAGEMENT DATA PREPARATION (SMDP+)

CROSS REFERENCE TO RELATED APPLICATIONS

This application is a National Stage of International Application No. PCT/US2022/045142 filed Sep. 29, 2022.

1. Field

Systems, apparatuses, and methods consistent with example embodiments of the present disclosure relate to generating and providing a network profile for an Embedded Universal Integrated Circuit Card (eUICC).

2. Description of Related Art

For years, mobile devices had been configured to accept and use a Subscriber Identity Module (SIM) card, also known as Universal Integrated Circuit Card (UICC), which traditionally took the form of a portable memory card physically insertable into and removable from the mobile device. These traditional removable SIM cards are configured to store data relating to user identity, location, phone number, network authorization, personal security keys, contact lists, and stored text messages.

Related art embedded SIM (eSIM) technology, which may also be referred to as embedded Universal Integrated Circuit Card (eUICC) technology, is under development to replace the traditional removable SIM cards. An eUICC system is configured to remotely activate a SIM that is embedded in the hardware of an eUICC mobile device thereby eliminating the need for a bulky removable SIM card and consequently enabling further miniaturization of consumer mobile devices Related art eSIM systems, however, is inefficient and expensive to telecommunications operators and their users. For example, when a subscriber wishes to change from one wireless technology, e.g., 4G, to another wireless technology, e.g., 5G, the user and the telecommunications operator must perform a manual, tedious, and time consuming process to make such change. This process consists of providing the user with a replacement eSIM profile, which is associated with a telephone number different from the user's previous telephone number, and changing the telephone number associated with the subscriber's replacement eSIM profile to the telephone number of the subscriber's previous eSIM profile.

Additionally, related art eSIM systems require separate records in an eSIM profile database for each eSIM that is associated with a different wireless technology. These separate records require a significant amount of memory space thereby increasing electronic storage cost and decreasing processing speeds in the processing of these records.

Further still, related art eSIM systems have proven costly for telecommunications operators or their subscribers when the subscribers change between using mobile devices that function on different wireless technologies because making this change often requires the purchase and provisioning of one or more additional eSIM profiles, even if the subscriber is using a wireless technology that the subscriber had already previously used.

Thus, it is desired to address the above-mentioned disadvantages and shortcomings of the related art systems and provide an improved eSIM provisioning system that decreases the burden on personnel of telecommunications operators, decreases memory usage of profile databases, increases processing speeds of processors that process data of the profile databases, and decreases the costs to telecommunications operators, who are often required to incur substantial costs for a multitude of profiles when their subscribers switch between using different wireless technologies.

SUMMARY

Accordingly, systems and methods for enabling seamless SIM profile transmission at a Subscription Management Data Preparation (SMDP+) are provided. In one embodiment, a method for providing a network profile for an Embedded Universal Integrated Circuit Card (eUICC) may include generating a first profile corresponding to a first communication protocol; generating a second profile corresponding to a second communication protocol; associating the first profile and the second profile with a same profile record; and providing either the first profile or the second profile to a user device based on a determined communication protocol, from among the first communication protocol and the second communication protocol, to be used by the user device.

The associating the first profile and the second profile with the same profile record may further include associating the first profile and the second profile with a same eUICC identification number in the profile record.

In addition or in the alternative, the associating the first profile and the second profile with the same profile record may further include associating the first profile and the second profile with a same mobile telephone number in the profile record.

Further, the associating the first profile and the second profile with the same profile record may further include associating the first profile and the second profile with a same mobile telephone number in the profile record.

Additionally, the first communication protocol may be associated with one generation of wireless technology, and the second communication protocol may be associated with another generation of wireless technology.

Also, the generating the second profile may include altering a copy of the first profile.

The altering the copy of the first profile may include deleting information in the first profile that is specific to the first communication protocol.

The method may further include receiving user device information from the user device and determining whether to provide, to the user device, the first profile or the second profile based on the received user device information.

The receiving the user device information may include receiving the user device information based on a quick response code or other machine-readable code provided to and scanned by the user device.

In another embodiment, a system for providing a network profile for an Embedded Universal Integrated Circuit Card (eUICC) may include a memory storing instructions; and at least one processor configured to execute the instructions to: generate a first profile corresponding to a first communication protocol; generate a second profile corresponding to a second communication protocol; associate the first profile and the second profile with a same profile record; and provide either the first profile or the second profile to a user device based on a determined communication protocol, from among the first communication protocol and the second communication protocol, to be used by the user device.

The associating the first profile and the second profile with the same profile record may further include associating the first profile and the second profile with a same eUICC identification number in the profile record.

The associating the first profile and the second profile with the same profile record may further include associating the first profile and the second profile with a same mobile telephone number in the profile record.

The first profile and the second profile may be associated with a same Mobile Station International Subscriber Directory Number (MSISDN) and a same international mobile subscriber identity number in the same profile record.

The first communication protocol may be associated with one generation of wireless technology, and the second communication protocol may be associated with another generation of wireless technology.

The generating the second profile may include altering a copy of the first profile.

The altering the copy of the first profile may include deleting information in the first profile that is specific to the first communication protocol.

The at least one processor may be further configured to execute the instructions to receive user device information from the user device and determine whether to provide, to the user device, the first profile or the second profile based on the received user device information.

The at least one processor may be further configured to execute the instructions to receive the user device information based on a quick response code or other machine-readable code provided to and scanned by the user device.

In yet another embodiment, a non-transitory computer-readable medium may store computer readable program code or instructions for carrying out operations, which when executed by a processor provide a network profile for an Embedded Universal Integrated Circuit Card (eUICC). The operations may include generating a first profile corresponding to a first communication protocol; generating a second profile corresponding to a second communication protocol; associating the first profile and the second profile with a same profile record; and providing either the first profile or the second profile to a user device based on a determined communication protocol, from among the first communication protocol and the second communication protocol, to be used by the user device.

The associating the first profile and the second profile with the same profile record may further include associating the first profile and the second profile with a same eUICC identification number in the profile record.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1A:
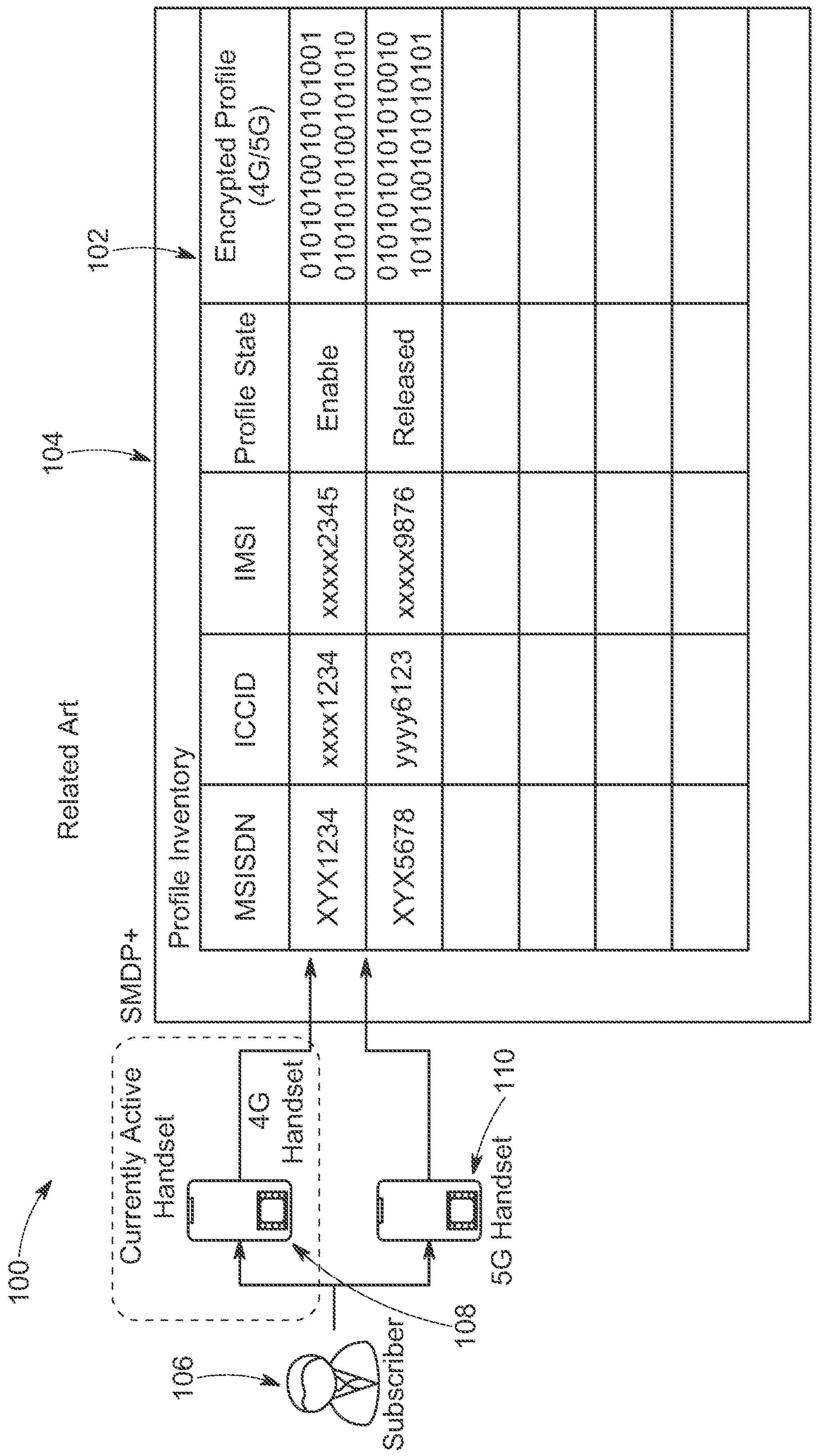
FIGS. 1A and 1B are block diagrams of a related art system.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide systems and methods that provide seamless SIM profile transmission at a Subscription Management Data Preparation Plus (SMDP+).

SMDP+ is an entity described in a technical specification named SGP.22, which was developed by the Global System for Mobile Communications, also known as the GSM Association (GSMA). The technical specification SGP.22 includes a Remote SIM Provisioning (RSP) architecture and further includes specific interfaces for use eEmbedded Universal Integrated Circuit Card (eUICC) systems. According to SGP.22, the SMDP+ entity may be capable of performing both Subscription Management Data Preparation (SMDP) functions and Subscription Management Data Routing (SMDR) functions in a Machine-to-Machine (M2M) solution. For example, the SMDP+ may create, download, remotely manage (e.g., enable, disable, update, and delete), and protect operator credentials. These operator credentials may be referred to herein as "eSIM profiles," "eUICC profiles," or simply "profiles." These profiles may be remotely provisioned by the RSP included in the SGP.22 technical specification. While the GSMA SGP.22 describes functions of the SMPD+, this technical specification does not provide information relating to an optimal process to create and update eSIM profiles.

While related art systems have used SMDP+ to create eSIM profiles, these related art systems have proven burdensome and inefficient for telecommunications operators when a customer (i.e., an end user or subscriber) of the telecom operator changes his or her mobile device to one that uses a different wireless communication protocol or standard. In general, each eSIM profile is specifically tailored for use with a particular wireless communication protocol or standard. Two exemplary wireless communication protocols to which eSIM profiles are specifically tailored include fourth- and fifth-generation wireless communication systems, i.e., 4G and 5G cellular networks. In general, for a mobile device to function on a 4G network, the mobile device must be 4G-compatible and the mobile device must be provided a 4G-specific eSIM profile. Similarly, for a mobile device to function on a 5G network, a mobile device must be 5G-compatible and must be provided a 5G-specific eSIM profile.

In a related art infrastructure of the SGP.22 RSP Technical Specification for a consumer device, it is the responsibility of SMDP+ to create 4G and 5G profiles for the consumer devices. The telecommunications operator/service provider sends a SIM file specification (sometimes referred to as File System Information) and an input file that contains subscriber information to SMDP+, and SMDP+ generates eUICC profiles for the consumer device.

With the development of the 5G network, a substantial number of subscribers may seek replace their 4G-compatible mobile devices with 5G-compatible mobile devices. As such, there became a need to develop systems that provide for a seamless and efficient transition of a 4G handset to a 5G handset. It is understood that while 4G or LTE and 5G communications technologies are exemplified in the present disclosure, other embodiments are not limited thereto, and the generated profile according to example embodiments may correspond to any two or more communications technologies.

FIG. 1A illustrates a related art system 100 that includes a profile inventory 102 of an SMDP+ entity 104. The profile inventory 102 includes two separate records, namely, a first profile record associated with a first communication protocol (4G) and a second profile record associated with a second communication protocol (5G).

As shown in FIG. 1A, each profile record is represented by one row in the profile inventory 102. Each profile record may have unique information associated with the profile record such as, e.g., a Mobile Station International Subscriber Directory Number or Mobile Station Integrated Services Digital Number (MSISDN), an Integrated Circuit Card Identification Number (ICCID), an International Mobile Subscriber Identity (IMSI) number, a profile state, and encrypted profile data, which may be binary data. In the profile inventory 102, the MSISDN, ICCID, IMSI number, profile state, and encrypted profile data of the first profile record is different from the MSISDN, ICCID, IMSI number, profile state, and encrypted profile data of the second profile record.

As shown in FIG. 1A a subscriber 106 may use either a 4G handset 108 or a 5G handset 110. In the embodiment shown, the subscriber 106 initially uses the 4G handset 108 and thus the 4G handset 108 is represented as the currently active handset. That is, the 4G handset 108 has been provided an eUICC profile that is a 4G-specific eSIM profile, and the 4G handset 108 is thereby configured to function using the 4G network. The first profile record associated with the 4G handset 108 initially has a profile state in an "enable" state, and the second profile record associated with the 5G handset 110 has a profile state in a "released" state.

After some time, for example, the subscriber 106 wishes to replace their 4G handset 108 with a handset that supports 5G, i.e., the 5G handset 110. However, the subscriber 106 wishes to keep their same phone number with their new handset. The related art system 100 imposes a burdensome and expensive process to replace the 4G handset 108 with the 5G handset 110 when the subscriber 106 wishes to keep their same telephone number with the 5G handset 110 that had been previously used with the 4G handset 108.

Figure 1B:
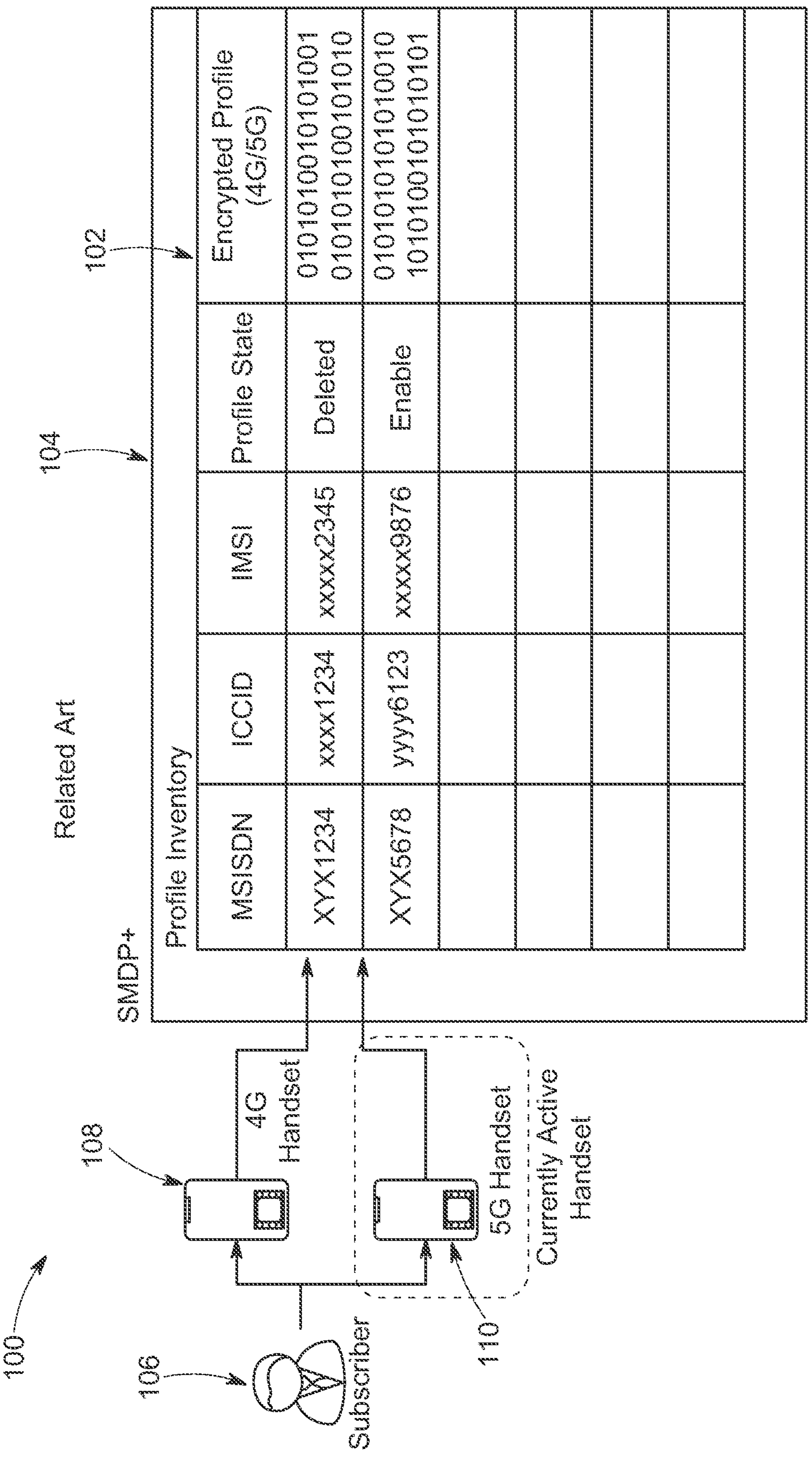

FIG. 1B illustrates a subsequent scenario of the related art system 100 in which the subscriber 106 has changed their currently active handset from the 4G handset 10 to the 5G handset 110. To make this change, the system 100 must delete the 4G eUICC profile, which is associated with the first profile record, and provide a 5G eUICC profile, which is associated with the second profile record (i.e., the 5G-specific profile record). For example, a Business Support System (BSS) of a telecommunications operator (or mobile network operator (MNO)) may be required to reserve a new profile, e.g., a 5G eUICC profile, which is then provided to the subscriber 106. As shown in the profile inventory 102, the profile state of the first profile record has been changed to a "deleted" state, and the profile state of the second profile record has changed to an "enable" state.

One disadvantage with the related art system 100 is when the subscriber 106 deletes their 4G eUICC profile and subsequently receives their 5G eUICC profile, the 5G handset 110, at least initially, has a different telephone number than the 4G handset. As previously noted, the MSISDN, ICCID, and IMSI associated with the second profile record is different from the MSISDN, ICCID, and IMSI associated with the first profile record.

To change the telephone number used with the 5G handset 110 to the telephone number previously used with the 4G handset 108, a complex process must be performed, inconveniencing all parties involved. First, the BSS (or, generally, the MNO) must reserve a new eUICC profile for the subscriber 106. Further, the BSS may be required to update the MSISDN of the reserved eUICC profile to be the MSISDN of the previous eUICC profile. This update process may be performed OTA (Over the Air), e.g., by SMS or through other OTA channel. The reservation and update process may take time and resources (e.g., personnel overhead and/or computational resources) of the BSS. Next, the subscriber 106 may be required to buy a new eUICC profile from the telecommunications operator or the service provider. Further, the subscriber 106 may be required to submit a request to port the subscriber's previous mobile telephone number to their new handset. This request may be referred to as a mobile number porting request. As such, the related art system 100 is inefficient, expensive, and burdensome for at least one of the subscriber 106, a telecommunications operator (e.g., a BSS of a telecommunications operator), a service provider, and SMDP+ 104.

Even though FIGS. 1A and 1B illustrate a subscriber 106 changing from an older communication protocol, e.g., 4G, to a new communication protocol, e.g., 5G, there may be scenarios where a user changes from a newer communication protocol, e.g., 5G, to an older communication protocol, e.g., 4G. In the related art system 100, it may be required to repeat the above-noted burdensome process any time a subscriber 106 changes communication protocols for any reason.

As discussed with respect to FIGS. 1A and 1B, a subscriber 106 may first change from using one wireless technology (e.g., 4G) to another wireless technology (e.g., 5G). This initial change may occur, e.g., when the subscriber replaces an older mobile device (e.g., 4G handset 108) with a newer mobile device (e.g., 5G handset 110). However, a situation may occur in which the subscriber 106 changes back to the first wireless technology (e.g., 4G). For example, if the subscriber 106 loses, damages, or destroys their newer mobile device (5G handset 110), the subscriber may then again use their older mobile device (4G handset 108). This will cause the subscriber 106, the telecommunications operator, and SMDP+ 104 to repeat the process of (1) deleting the existing eUICC profile (in this instance, the 5G eUICC profile), (2) obtaining and providing to the replacement handset (the 4G handset 108) a new eUICC profile (a 4G eUICC profile), which has yet another different phone number, and (4) changing the phone number associated with the replacement handset's eUICC profile to the phone number the subscriber 106 is accustomed to using. In addition to consuming time and resources of the telecommunications operator and SMDP+ 104, the subscriber may be required to pay for either a telecommunications operator or a service provider for the new eUICC profile, which in this instance is a 4G eUICC profile for the subscriber's 4G handset 108 that the subscriber 106 is using to replace their lost, damaged, or destroyed 5G handset 110.

In this exemplary scenario, the telecommunications operator (or the subscriber 106) pays for three eUICC profiles: That is, one eUICC profile for a first wireless technology (e.g. the subscriber's first 4G eUICC profile), one eUICC profile for a second wireless technology (e.g., the subscriber's 5G eUICC profile), and another eUICC profile for the first wireless technology (e.g., the subscriber's second 4G eUICC profile). A purchase of the third profile may be required because, according to the related art system 100, once an eUICC profile is deleted, the related art system 100 may not use the deleted eUICC profile again, even if the subscriber uses the first communication protocol after using a second communication protocol. Instead, a new eUICC profile may need to be purchased and reserved for the subscriber 106 each time the subscriber 106 changes communication protocols for any reason. An additional burden is also imposed on SMDP+, which must provide sufficient resources (e.g., memory) to store the excessive number of profile records unique and specific to each communications technology, and expensing additional processing and computational resources to facilitate the complex process of provisioning and changing profiles.

Further still, there may be yet another scenario when a subscriber 106 loses, damages, or destroys their (e.g., 5G) mobile device. After losing, damaging, or destroying a their (5G) mobile device, the subscriber 106 may only temporarily use their older (e.g., 4G) mobile device. For example, the subscriber 106 may either find their lost (5G) mobile device or purchase another (5G) mobile device to replace the lost, damaged, or destroyed (5G) mobile device. In this exemplary scenario, the telecommunications operator or the subscriber 106 may be required to pay for yet another eUICC subscriber profile, i.e., another 5G eUICC profile for the found or replacement 5G mobile device.

In another scenario, a subscriber 106 may have a handset that supports two or more communication protocols. The handset may first be configured with a first eUICC profile, which enables the handset to use a first network associated with the first communication protocol. Thereafter, the subscriber may desire to use another network associated with another communication protocol that the handset supports. In this case, even though the subscriber 106 is only using one handset, as opposed to a plurality of handsets that permanently or temporarily replace one another, the subscriber 106 of such a multifunctional handset may be burdened by the expensive and arduous process offered by the related art system 100 when the subscriber 106 transitions between communication protocols while maintaining a consistent telephone number.

Thus, there are multiple problems with the related art system 100. First, porting an eUICC profile from one (e.g., 4G) handset to another (e.g., 5G) handset (or vice versa) requires a complex process. Second, there is a duplication of records/profiles within the SMDP+ database, which is an inefficient use of a significant amount of memory. Also, the telecommunications operator may be required to create different production batches, e.g., a first production batch for 4G eUICC profiles and a second production batch for 5G eUICC profiles. Having to pay for different production batches may cost a significant amount of money. The following methods and systems either mitigate or eliminate the above-noted problems existing in the current infrastructure.

Figure 2:
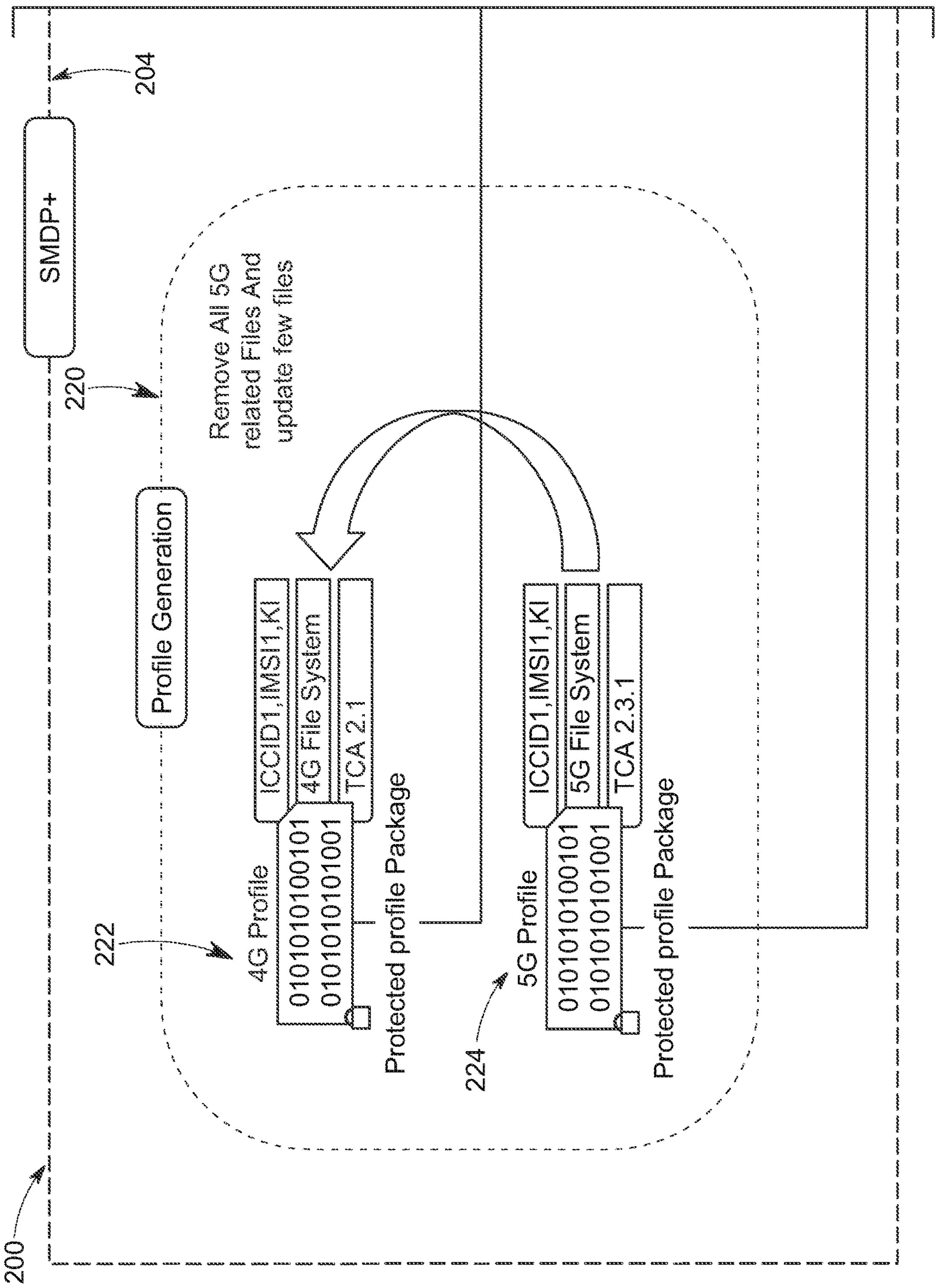
FIG. 2 is a functional block diagram showing a profile generation application of an SMDP+ that generates a first protected profile and a second protected profile that stored in a single profile record within a profile inventory.

FIG. 2 is an improved system 200 having an SMDP+ 204 including a profile generation application 220 and a profile inventory 202. The profile inventory 202 may be a database that stores profile records. According to one embodiment, there at least two profiles (e.g., one 4G profile and one 5G profile) are created for each ICCID.

For example, the profile generation application 220 first generates a first profile (e.g., a 5G profile 224), then generates an associated second profile (e.g., a 4G profile 222) by making alterations, e.g., minor adjustments, to the first profile. The second profile may be generated by making a copy of the first generated profile, and altering the copy of the first profile to generate the second profile. For example, the profile generation application 220 may first generate a 5G profile 224 that has a 5G file system. The profile generation application 220 may then make a copy of the 5G profile, and then the profile generation application 220 may delete files from the copy of the 5G profile 224 that only pertain to the 5G file system. In addition to or in the alternative to deleting files, the profile generation application 220 may modify or update one or more files in the copy of the 5G profile 224 to generate the 4G profile 222. These alterations (e.g., deletions and/or file updates) of the copy of the 5G profile 224 may result in the generation of a 4G profile 222. In both of the generated profiles, all of the Mobile Network Operator (MNO) information (ICCID, IMSI, encryption keys, etc.) remain the same. SMDP+ may then encrypt the generated profiles to protect them and further store the protected profiles in a profile inventory at SMDP+. In one embodiment, the first and second profiles may be encrypted and stored simultaneously after the second profile is generated from a copy of the first profile.

The timing of when the first and second generated profiles are encrypted is not necessarily limited, and a copy of the first generated profile may not be made. For example, a first profile (e.g., a 5G profile 224) may be generated, encrypted, and immediately stored in the profile inventory 202 before the second (e.g., 4G profile 222) is generated. In this embodiment, a copy of the first profile may not be required because an encrypted version of the first profile has already been stored. Thus, the unencrypted version of the first profile may be altered or modified to generate the second profile. Once the second profile is generated, an encrypted version of the second profile may be stored in the profile inventory 202.

Further, instead of deleting files from a first profile to generate a second profile, the second profile may be generated by adding files to a first profile. For example, a 4G profile 222 may be generated first, and a 5G profile 224 may subsequently be generated by altering the 4G profile. For example, after a 4G profile 222 is generated, the 4G profile or a copy of it may be altered by adding files to the 4G profile 222 that only pertain to the 5G file system and/or updating files in the 4G profile 222 to generate the 5G profile 224.

Further still, in an alternative embodiment, the first and second profiles may be created simultaneously. Therefore, the first and second profiles may be generated without altering one profile, or a version of it, in the generation of another profile. The first profile and the second profile may be generated in parallel, e.g., at or near the same time, or with at least some temporal overlap. Such simultaneous or near simultaneous generation of two profiles, which are specific to two different communication protocols, may be generated by parallel processing.

As shown in FIG. 2, there is only one row in the profile inventory 202, and thus there is only profile record generated in the SMDP+ database for each subscriber. The single profile record includes two protected profiles, which are specific to two different communication protocols, and these two protected profiles are associated with a single MSISDN, ICCID, IMSI, and profile state in the profile inventory 202. Accordingly, the SMDP+ 204 includes a profile inventory 202 that stores less data as compared to the profile inventory 104 of SMDP+ 104, thereby conserving resources and providing a technical advantage over related art systems.

Additionally, the SMDP+ 204 shown in FIG. 2 is advantageous because it can be used in a system that determines which of the eUICC profiles stored in the profile inventory 202 is the appropriate eUICC profile to provide a subscriber's mobile device. The determination of the appropriate eUICC by SMDP+ 204 may occur at the time an eUICC profile is to be downloaded or while an eUICC profile is being downloaded. In the embodiment shown in FIG. 3, the appropriate eUICC profile may be either a 4G profile or a 5G profile. The determination of the appropriate eUICC by SMDP+ 204 may depend on capabilities of the subscriber's mobile device and the types of eUICC profiles that stored in the profile inventory 202. With this determination by SMDP+ 204, SMDP+ 204 thereby downloads the appropriate profile to the eUICC of the subscriber's mobile device. Neither the BSS nor the subscriber need to have knowledge of the technological capabilities of the subscriber's mobile device or the eUICC type. Thus, the SMDP+ 204 shown in FIG. 2 may be used in a simplified profile porting process.

The SMDP+ 204 illustrated in FIG. 2 is advantageous in that the eUICC profile/record generated by SMDP+ 204 includes multiple profiles that are compatible with multiple technologies. The customer, end user, or subscriber does not need to have knowledge about, e.g., the technological capabilities of their handset or mobile device. Any new handset or mobile device may be capable of automatically downloading the eUICC profile/record and being provided a suitable eUICC profile based on the available technology in the device. A customer, end user, or subscriber may only be required to (1) disable and/or delete a profile from their previous or existing handset/mobile device and (2) download the same eUICC profile using their new handset/mobile device.

Another advantage of one or more example techniques presented herein include a reduction in previously existing costs related to the generating of eUICC profiles, which may save money for a telecommunications operator (or the subscribers of the telecommunications operator who may ultimately bear the burden of paying for such costs). With the system shown in FIG. 2, an eUICC profile that has been previously used may be used again, even if the subscriber used another eUICC profile on another handset/mobile device before reusing the eUICC profile. As such, a new eUICC profile does not need to be purchased, created, and/or provisioned each time a subscriber changes between communication protocols; only the original eUICC profile for the subscriber must be generated or purchased.

Yet another advantage of one or more example techniques presented herein is a reduction in an amount of data and consequently a reduction in the associated data storage cost to maintain the a profile inventory 202 of the SMDP+ 204 as compared to the profile inventory 102 of the related art system 100 shown in FIG. 1. For example, since SMDP+ 204 generates two profiles (e.g., one 4G profile and one 5G profile) that share the same Mobile Network Operator (MNO) information (ICCID, IMSI, encryption keys, etc.), as opposed to the related art system 100 that includes two profiles having different MNO information, there is no duplicative information for each subscriber or profile, and database storage in the SMDP+ profile inventory 202 is minimized. Since telecommunications operators may have tens or hundreds of thousands of subscribers, or more, the aggregate total of such reduction of database storage may be substantial. Further, the systems that process the information stored in the profile inventory 202 process data more quickly, e.g., because these systems sort through less information when processing the data in the profile inventory 202.

According to one or more example embodiments described herein, an exemplary system architecture includes a Business Support System (BSS) of a telecommunications operator, wherein the BSS includes software and/or processes that perform a variety of functions for a telecommunications operator. Some of the functions that BSS perform may be referred to as "back office" functions. For example, a BSS of a telecommunications operator may perform functions such as managing orders, products, billing, fraud, ratings, and customer relations. A BSS may also provide, e.g., revenue assurance and business intelligence. Further, BSS may also perform functions such as the creation of production batch requests on an SMDP+ platform for the creation of eUICC profiles. While a BSS is described hereinbelow, it is understood that the BSS may be replaced or an example of any system or personnel of a mobile network operator that interacts with an SMDP+ platform.

The BSS may, e.g., provide an input file to SMDP+. The input file may contain subscriber information such as IMSI, ICCID, MSISDN, etc. After a generation of a profile, the BSS may receive an output file for that corresponding batch. The output file may include the subscriber information, and the output file may further include generated OTA keys for a plurality of subscribers. The BSS may then provision the output file to a Home Location Register (HLR).

An exemplary system architecture in accordance with the techniques presented herein may further include a profile generation application, which may be a component of SMDP+. In general, SMDP+ may be responsible for the creation of profiles. A profile may include at least two items: (1) an information profile template (which may include a profile structure) and (2) MNO information. The profile generation application of SMDP+ may be responsible for creating and personalizing the profile template.

A profile template generation application may receive a SIM file specification, also known as a SIM profile specification file, as an input. The SIM file specification may indicate the particular types of information that one or more eUICC profiles should contain. Exemplary particular types of information that one or more eUICC profiles may contain include, e.g., different MNO information including but not limited to IMSI, ICCID, MSISDN, etc. Additionally, while the SIM file specification may specify the types of subscriber information that may be included in one or more eUICC profiles, the SIM file specification may not include actual personal information of subscribers, such as one or more subscriber's MSISDN, which may be the full telephone number of the subscriber(s).

This profile template generation application may generate a profile template based on the information (e.g., the file system information) provided in the SIM file specification. The profile template may also be referred to as an unpersonalized profile because (1) the profile template may have nearly all of the information in one or more SIM alliance standards, (2) the profile template may be downloaded to one or more traditional removable eUICC cards, e.g., for testing, but (3) the profile template may not be used with any specific network because the profile template may not have any network-related information.

The exemplary system architecture may further include one or more components that personalize the generated profile template. In one embodiment, the profile template generation application performs this process. The profile personalization process may be a process in which values from an input file, e.g., a file that contains actual subscriber information, may be transferred or inserted into the profile template. Lastly, the profile generation application may generate OTA and network keys, which may be used for providing OTA updates to an eUICC profile.

Figure 3:
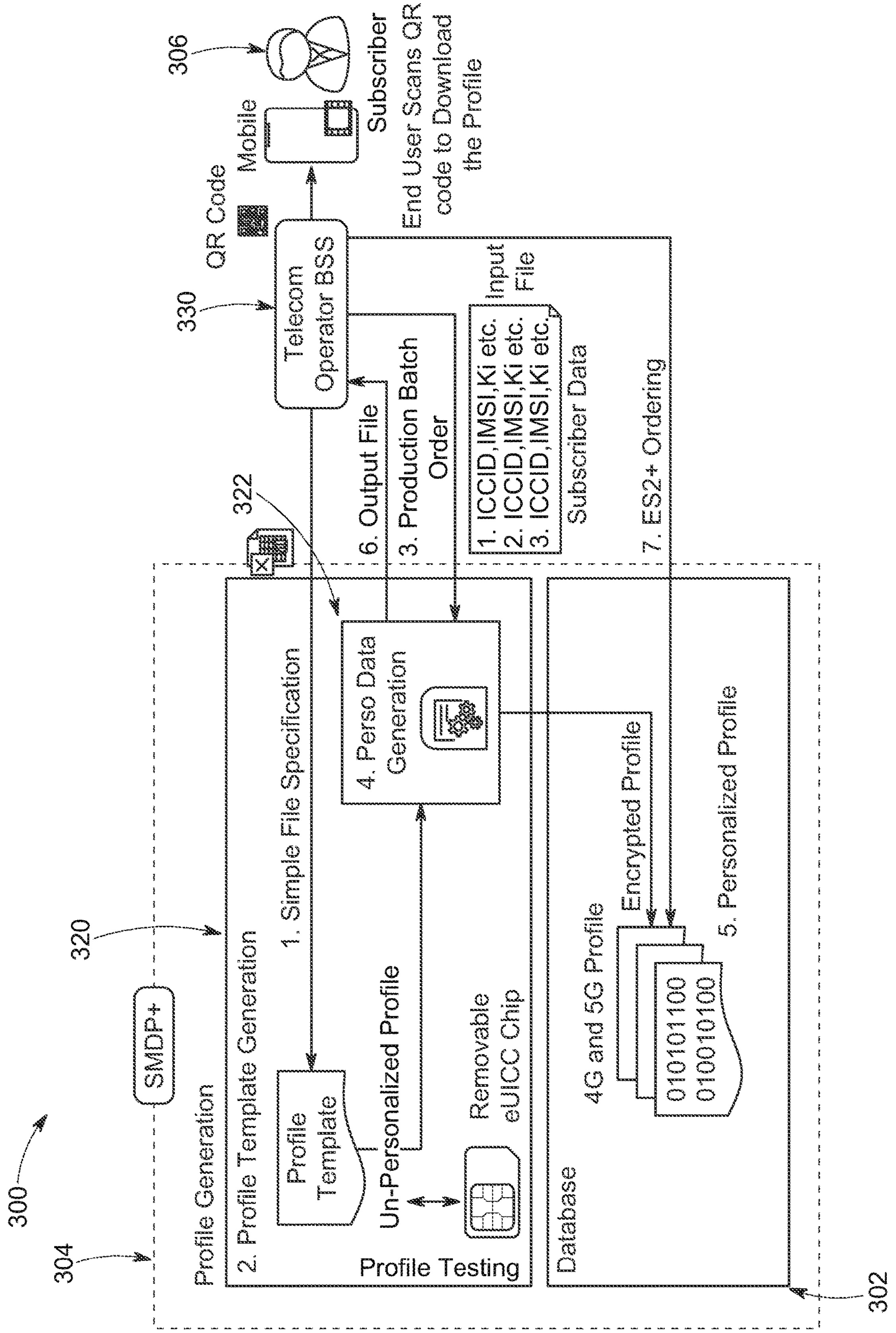
FIG. 3 is a functional block diagram showing interactions between an SMDP+, Business Support System (BSS) of a telecommunications operator, and a subscriber.

FIG. 3 illustrates a functional block diagram 300 that shows interactions between an SMDP+ 304, a Business Support System (BSS) 330 of a telecommunications operator, and a subscriber 306. FIG. 3 may relate to an exemplary use case, general operation, or general informational flow of a system of eUICC profile generation in SMDP+ according to the techniques described herein. Such process may include, e.g., generation of profiles, ordering the profiles, and downloading the profiles.

In one embodiment, a BSS 330 of telecommunications operator begins the process by transmitting a SIM specification document to a profile template generation application 320 of an SMDP+ 304. The profile template generation application 320 may generate one or more profile templates using the received SIM specification document. As noted, the profile template may have nearly complete information of a SIM file system, e.g., according to one or more SIM alliance standards. In one embodiment, the only information missing from the profile template is the actual subscriber information (IMSI, ICCID, MSIDN etc.).

Second, the profile template may be provided as an input to an application referred to herein as a PersoData generation application 322.

Third, the BSS 330 may submit to the PersoData generation application 322 a production batch request, also known as a production batch order. The production batch request/order may be accompanied by or include a file containing subscriber data that is provided to the PersoData generation application 322 as an input file.

Fourth, upon receiving the input file that contains the subscriber data, the PersoData generation application 322 may "personalize" the profile template with the subscriber information, e.g., in a sequential manner. Personalization of a profile template may refer to the inserting of actual subscriber information into appropriate data storage locations in the profile template.

While the profile template may be personalized with subscriber information in a sequential manner, in another embodiments, all of the subscriber information may be inserted into the profile template at one time, and in yet another embodiment, information may be inserted into the profile template in groups, chunks, or batches of information.

Fifth, the PersoData generation application 322 may store the personalized profile into an SMDP+ database 302 in a protected format, e.g., in an encrypted format.

Sixth, the PersoData generation application 322 may generate one or more output files that, e.g., contain keys for information networks, keys for OTA, etc. In one embodiment, the output files must be provisioned in an HLR. The PersoData generation application 322 may send the output file to the BSS 330, who may have a list of all of the ICCID values created for each of the subscribers whose subscriber data had been previously provided to the PersoData generation application 322.

Seventh, the BSS 330 may reserve a profile for of such subscribers, and the profile reservation may use an ICCID value in an ES2+ interface. After reserving a profile for a subscriber, the end user may receive a Quick Response (QR) code, which the subscriber may scan, e.g., using their mobile device, and upon scanning the QR code, the subscriber's mobile device may download the appropriate profile. Instead of scanning a QR code, a subscriber may be provided any other machine-readable code now known or later developed, or the subscriber may be provided with a URL or other website link. Upon scanning the machine-readable code or accessing the website/URL, the subscriber's mobile device may automatically download the appropriate eUICC profile.

Figure 4:
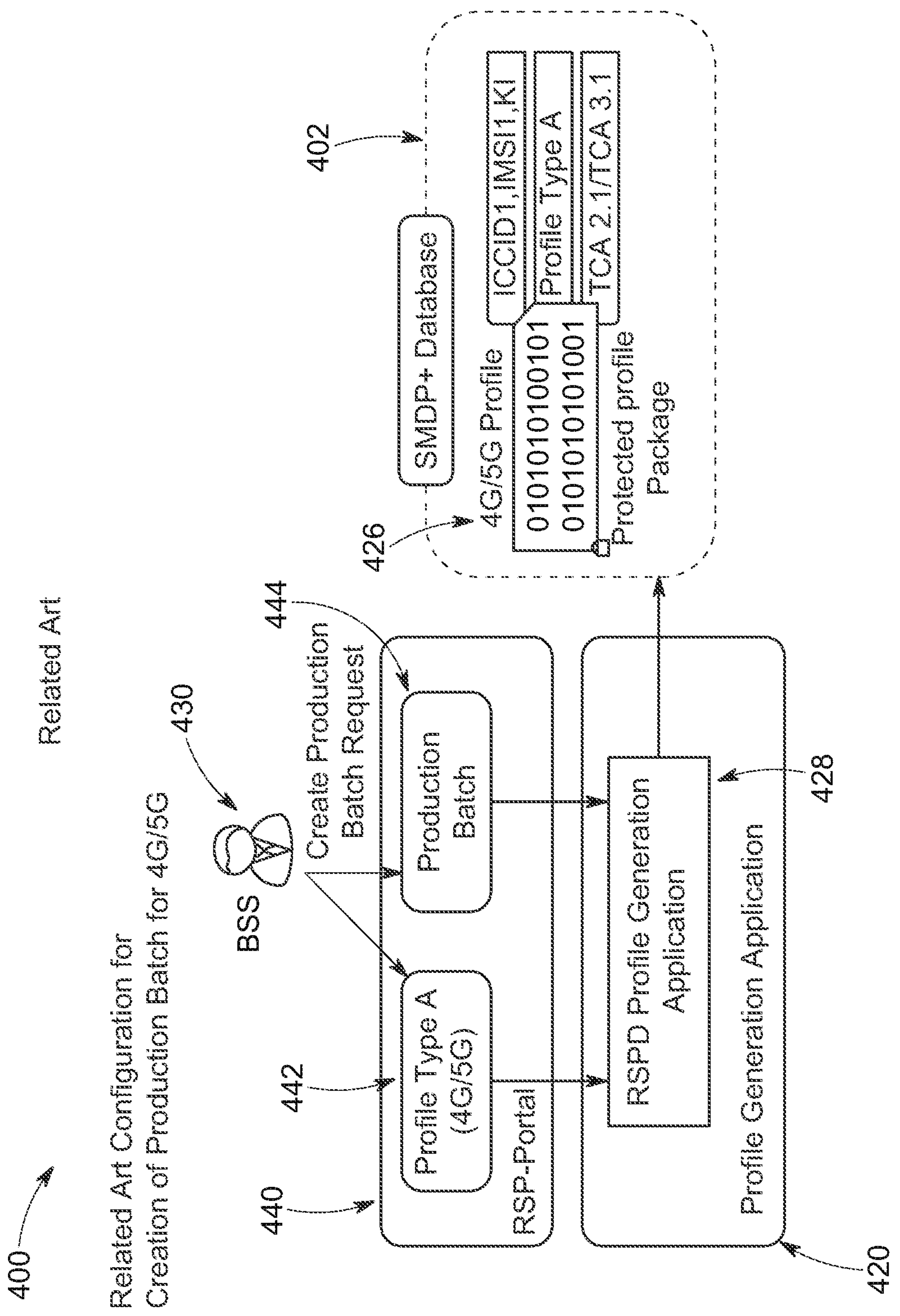
FIG. 4 is a functional block diagram of a related art configuration that creates only a single protected profile package.

FIG. 4 is a functional block diagram 400 of a related art configuration that creates only one single protected profile package for a given user at a given time. FIG. 4 specifically shows the creation of production batch request according to such conventional configuration.

In this related art configuration, a BSS 430 may create a production batch request using a Remote SIM Provisioning (RSP) portal 440 included within a profile generation application 420. In this request, the BSS 340 must indicate the kind or type of profile to generate, e.g., either a 4G profile or a 5G profile. The requested profile type may be captured as profile type data 442 within the RSP Portal 440. Additional information relating to the production batch request may be captured as production batch data 444 in the RSP Portal 440. The RSP profile generation application 428 may receive both the profile type data 442 and the production batch data 444.

The RSP profile generation application 428 (also known as a SIM profile development application) may interact with the RSP Portal 440 to generate a profile 426 of the kind or type specified in the production batch request. In particular, after the RSP profile generation application 428 receives the profile type data 442 and production batch data 444, the RSP profile generation application 428 may generate the profile 426 and store it in an SMDP+ database 402. A major drawback of this conventional system is the subscriber profile is only associated with one profile-type (e.g., either 4G or 5G) in accordance with the profile specified in the production batch request.

Figure 5:
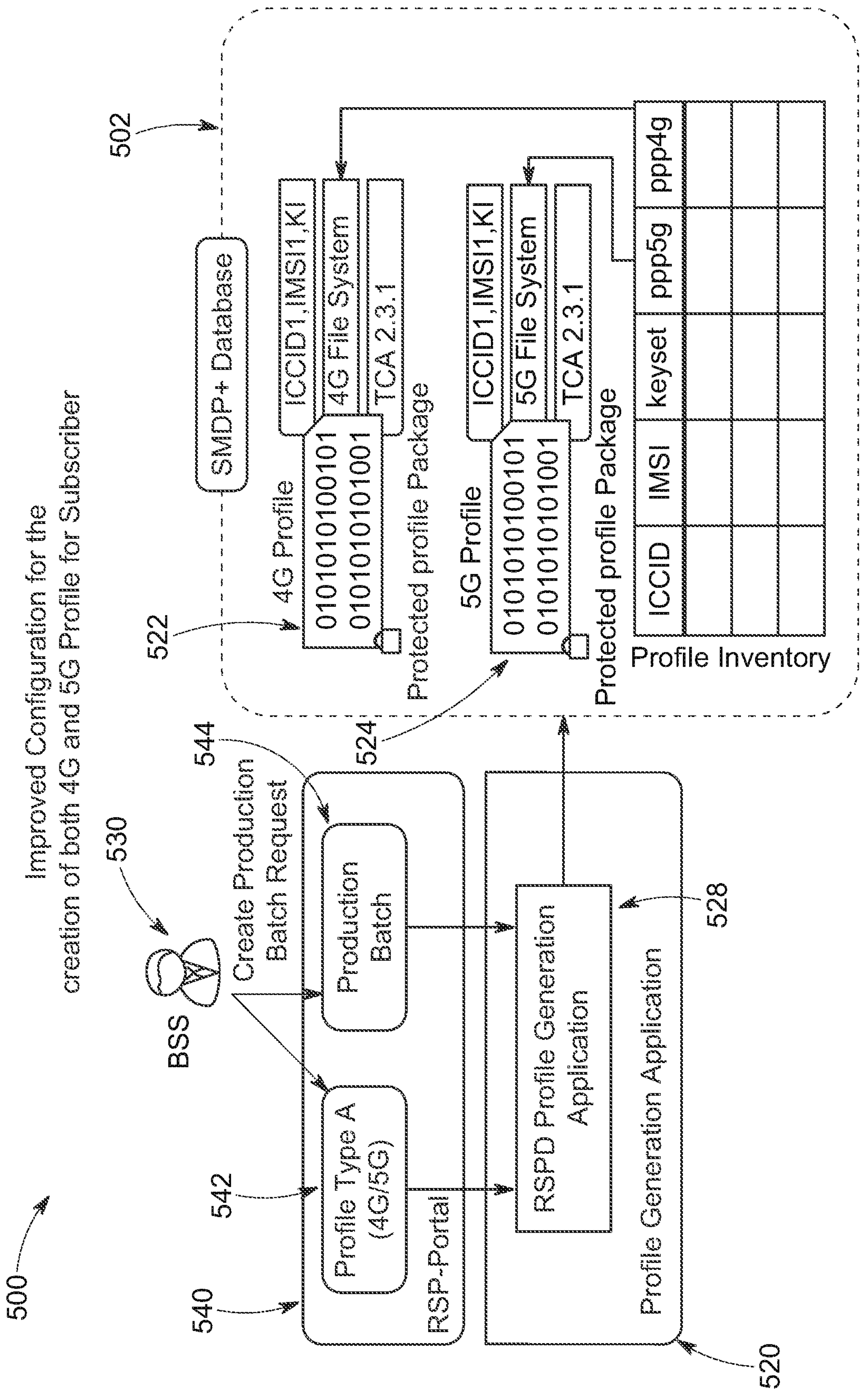
FIG. 5 is a functional block diagram of a system that generates at least two protected profile packages, which are stored in a single profile record within a profile inventory.

FIG. 5 is a functional block diagram 500 of an improved system that generates at least two protected profile packages, which may be stored in a single profile record within a profile inventory. Similar to the configuration shown in FIG. 4, as shown in FIG. 5, BS 530 creates a production batch request at an RSP Portal 540, and the request specifies a profile type data 542 stored as profile type data 542 in the RSP Portal 540. The production batch request may also include additional information stored as production batch data 544 in the RSP Portal 540. An RSP profile generation application 428 may receive the profile type data 542 and production batch data 544.

The configuration shown in FIG. 5, however, is different from that shown in FIG. 4 because the RSP profile generation application 528 generates for a single subscriber at least two distinct profiles (e.g., a 4G profile 522 and a 5G profile 524) that are stored in a single profile record in an SMDP+ database 502. Additionally, in the system according to example embodiments, when the BSS 530 creates a production batch request for any profile types (e.g., either a 4G or a 5G profile type), the RSP profile generation application 528 (also known as a SIM profile development application) may generate at least two profiles for the subscriber of interest. That is, the profile generation application 428 may generate both a 5G profile 524 and a 4G profile 522. In one embodiment, both profiles are similar; the main difference is the 5G profile 524 includes a few more files than the 4G profile 522, and the additional files were created and stored in the file system of the 5G profile 524.

While FIG. 5 illustrates the creation of only two profiles, the RSP profile generation application 528 may be configured to generate three, four, or any number of profiles for each subscriber upon receiving production batch data 544. Further, instead of or in addition to 4G and 5G profiles, the RSP profile generation application may be configured to generate profiles that pertain to any communication protocol now known or later developed.

Figure 6:
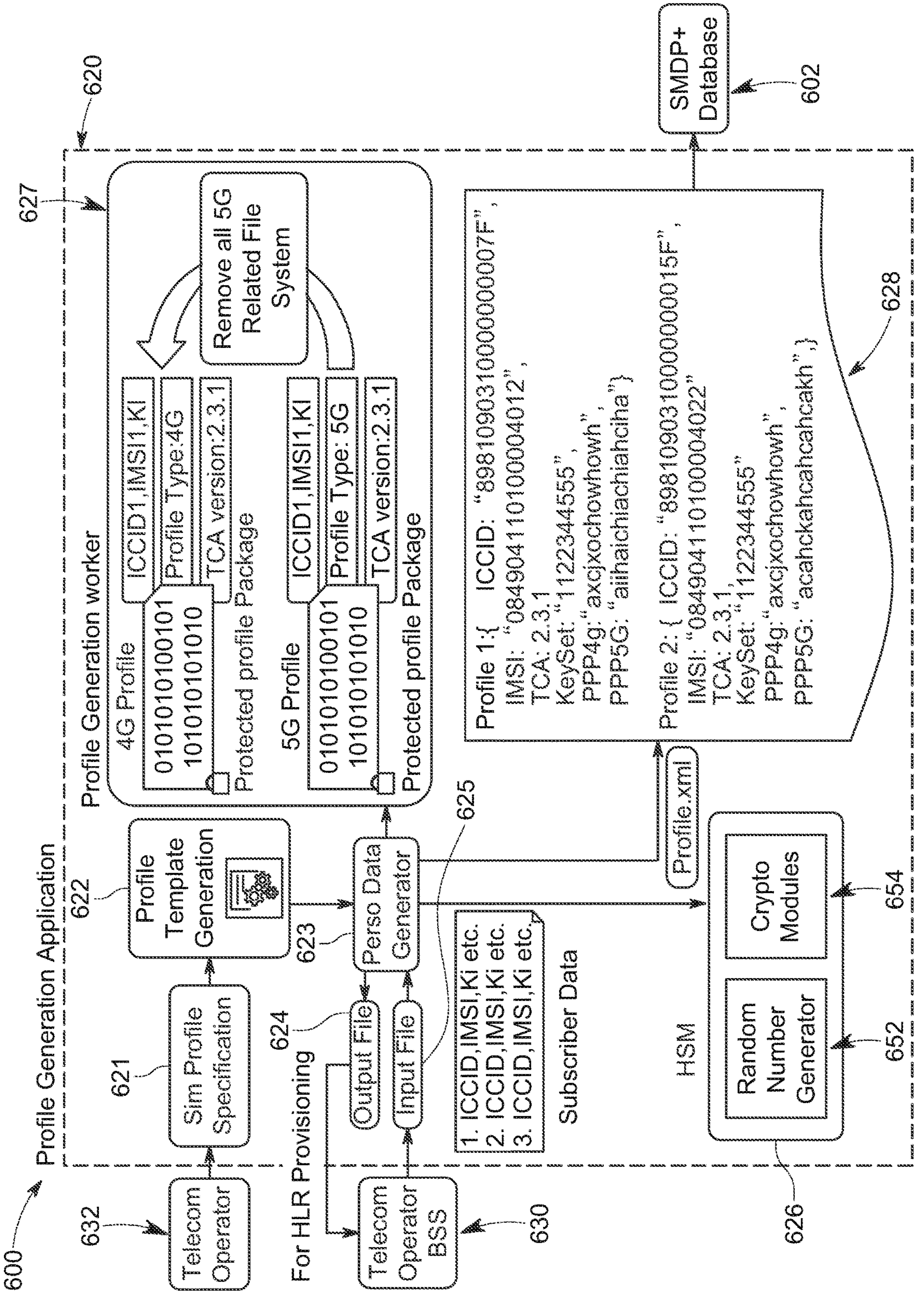
FIG. 6 is a functional block diagram showing interactions between a profile generation application and a telecommunications operator, a BSS of the telecommunications operator, and an SMDP+ database.

FIG. 6 is a functional block diagram 600 showing interactions between a profile generation application 620, a telecommunications operator 632, a BSS 630 of the telecommunications operator, and an SMDP+ database 602.

In one embodiment, a profile template generation application 622 of a profile generation application 620 receives a SIM profile specification 621. The profile template generation application 622 uses the SIM profile specification 621 to generate a profile template, which is then provided to a PersoData generation application 623. Additionally, a BSS 630 of the telecommunications operator may provide an input file 625, which may include subscriber data, to the PersoData generation application 623. The PersoData generation application 623 may read the subscriber information from the input file 625, e.g., in a sequential manner, and populate the appropriate values in the generated profile template. Additionally, the PersoData generation application 623 generate network and OTA keys, and these keys may be generated using a random number generator 652 of a hardware security module (HSM) 626.

Also, the profile generation application 623 may generate an output file 624 that may contain all of the subscriber information in addition to the encrypted OTA and network keys. In this embodiment, encryption may be performed by a cryptography module 654 of the HSM 626. Information associated with the output file 624 may be provisioned, e.g., at a later time, to an HLR via the BSS 630.

Further, the PersoData generation application 623 of the profile generation application 620 may communicate with a profile generation worker 627. The PersoData generation application 623 or the profile generation worker 627 may first generate one or more 5G profiles and protect them with profile protection keys to generate a 5G Protected Profile Package (PPP5g). Then the profile generator worker 627 may remove all of the 5G-related files and change such removed 5G-related files to make them 4G compatible. Then the profile generator worker may protect the 4G files with the same profile protection keys to generate a 4G Protected Profile Package PPP4g.

Additionally, the PersoData generation application 623 may generate a file that is to be stored in the SMDP+ database 602. This file to be stored in the SMDP+ database 602 may be an extensible markup language (XML) file. However, this file may be stored in any suitable file format and may be any file format, e.g., that is used to format Web pages. This file may include at least two PPPs (Protected profile packages), e.g., one with the 4G file system Information (PPP4g) and another with the 5G file system information (PPP5g). This file may later be used in an onboarding process, e.g., the file may be onboarded to the SMDP+ database 602.

Figure 7:
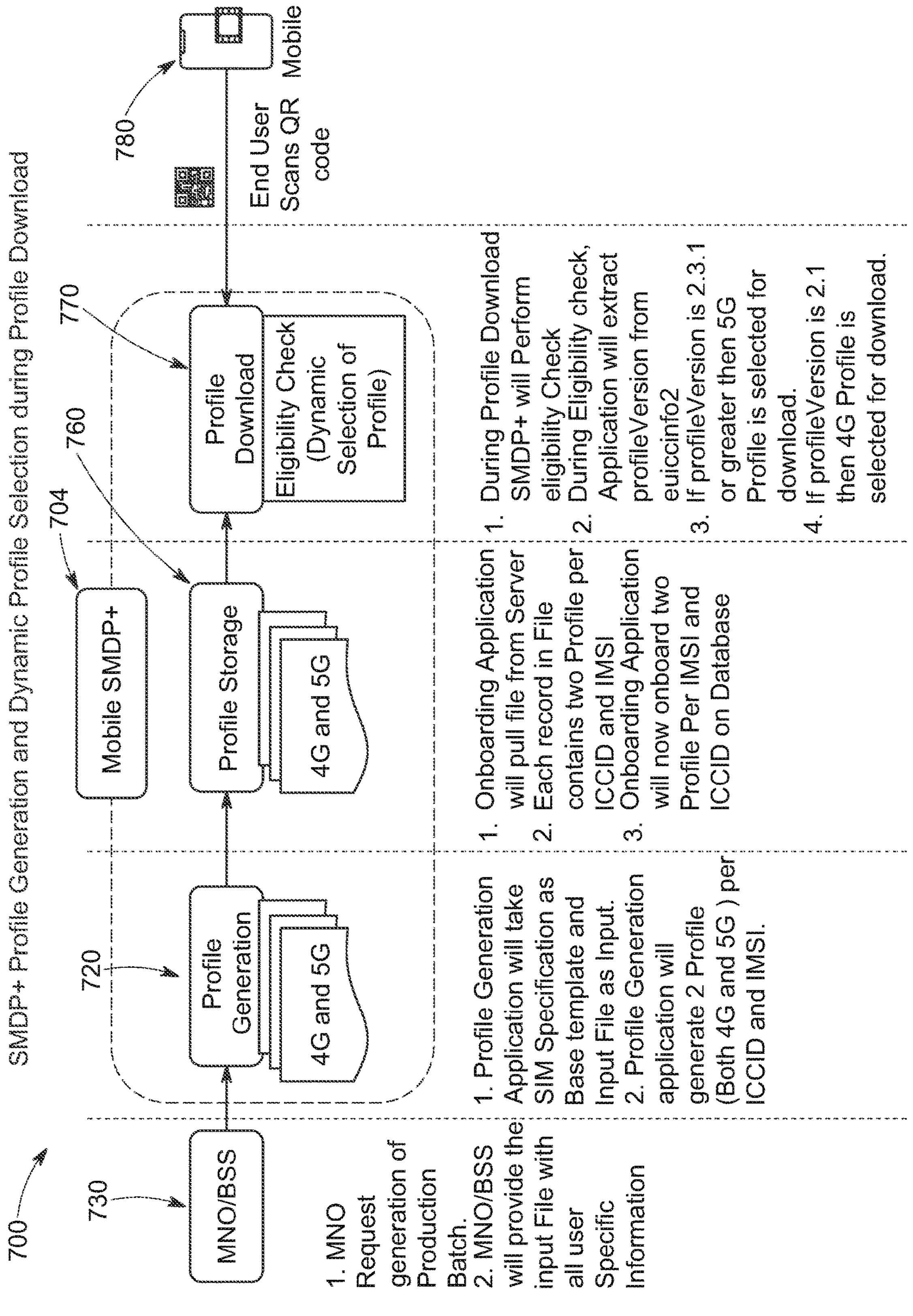
FIG. 7 is a functional block diagram showing interactions between a Mobile Network Operator (MNO), a BSS, an SMDP+, and a subscriber's mobile device.

FIG. 7 is a functional block diagram 700 showing interactions between an MNO/BSS 730, an SMDP+ 704, and a subscriber's mobile device 780. FIG. 7 specifically shows an embodiment in which a dynamic selection of a profile by the SMDP+ 704 occurs during a profile download process.

The SMDP+ 704 may include a profile generation application 720, a profile storage application 760, and a profile download application 770. The profile download application 770 may perform an eligibility check, and the eligibility check may pertain to a dynamic selection of an eUICC profile.

In particular, the MNO/BSS 730 may request generation of a production batch. The request to generate a production batch may be made to the profile generation application 720. The MNO/BSS 730 may provide an input file; the input file may include user specific information; and the input file may be provided to the profile generation application 720.

The profile generation application 720 may receive SIM specification information, and the profile generation application 720 may use the SIM specification information as a template. The profile generation application 720 may further receive the input file from the MNO/BSS 730 and use the input file as an input. In one embodiment, information from the input file is used to modify the template. The profile generation application 720 may generate two or more profiles for each ICCID and IMSI. In one embodiment, the profile generation application 720 generates a 4G profile and a 5G profile. The profile generation application 720 may then provide information to the profile storage application 760.

The profile storage application 760 may receive information relating to the two or more profiles generated by the profile generation application 720. The profile storage application 760 may use an onboarding application to obtain a file from a server. The file obtained by the onboarding application may include one or more records, and each record may contain two or more profiles per ICCID and IMSI. The onboarding application may be used to onboard two or more profiles per ICCID and IMSI on a database. The profile storage application 760 may communicate with the profile download application 770.

The profile download application 770 may perform an eligibility check. In one embodiment, the profile download application 770 performs a dynamic selection of a profile from the two or more profiles. For example, the SMDP+ 704 may perform the eligibility check during a profile download process. During an eligibility check, an application may obtain or extract a profile version from a file that contains eUICC information. In one embodiment, a "profileVersion" may be obtained or extracted from "euiccInfo2." If the profile version is greater than or equal to a predetermined profile version, a first profile is selected for download. For example, if the obtained/extracted profileVersion is 2.3.1 or greater, then a 5G profile is selected for download. If the profile version is less than the predetermined profile version, then a second profile is selected for download. For example, if the obtained/extracted profile Version is 2.1, then a 4G profile is selected for download. Instead of determining whether the profile version is greater than or equal to a predetermined profile version, the determination may include determining whether the profile version is less than or equal to a predetermined profile version. Further, the SMDP+ 704 may use any another method of selecting the appropriate profile, and this selection may include but does not necessarily include using an obtained/extracted profile version and profile versions of two or more profiles available for download.

As mentioned above, for any production batch request, a SIM profile development application may generates two or more profiles (e.g., at least a 4G and a 5G profile) for each customer/subscriber/end user. Further, a subscriber may be provided with a QR code or the like, and upon scanning the QR code, SMDP+ 704 may perform an eligibility check in the computer system associated with SMDP+ 704. SMDP+ 704 may check whether the device and the eUICC are capable of a functioning using a first communication protocol; e.g., the system may check whether the device is 4G capable. In this instance, the SMDP+ 704 may then select the 4G profile for download on the subscriber's mobile device 780 if the subscriber's mobile device 780 is 4G capable. If the subscriber's mobile device 780 and the eUICC are 5G capable, however, the SMDP+ 704 may select the 5G profile for download on the subscriber's mobile device 780.

As such, SMDP+ 704 provides a dynamic selection of eUICC profile according to the available technologies. In the above, even though transitions from 4G to 5G and from 5G to 4G are used as examples, it should be understood that the communication protocols are not limited to these specific communication protocols. The techniques provided herein may be applied to any suitable technologies, such as, e.g.; 4G to 6G, 6G to 5G.

Additionally, while the techniques provided herein disclose generating two eUICC profiles, e.g., a 4G profile and a 5G profile, there may be any number of eUICC profiles downloaded for each subscriber, and the amount of eUICC profiles that are generated, encrypted, and stored may depend on, e.g., which communication protocols are available to the subscribers of interest at any given time. As such, the techniques provided herein may further include making a determination of how many and the specific types of profiles to generate that would allow subscribers to easily switch between communication protocols available to the subscribers.

Figure 8:
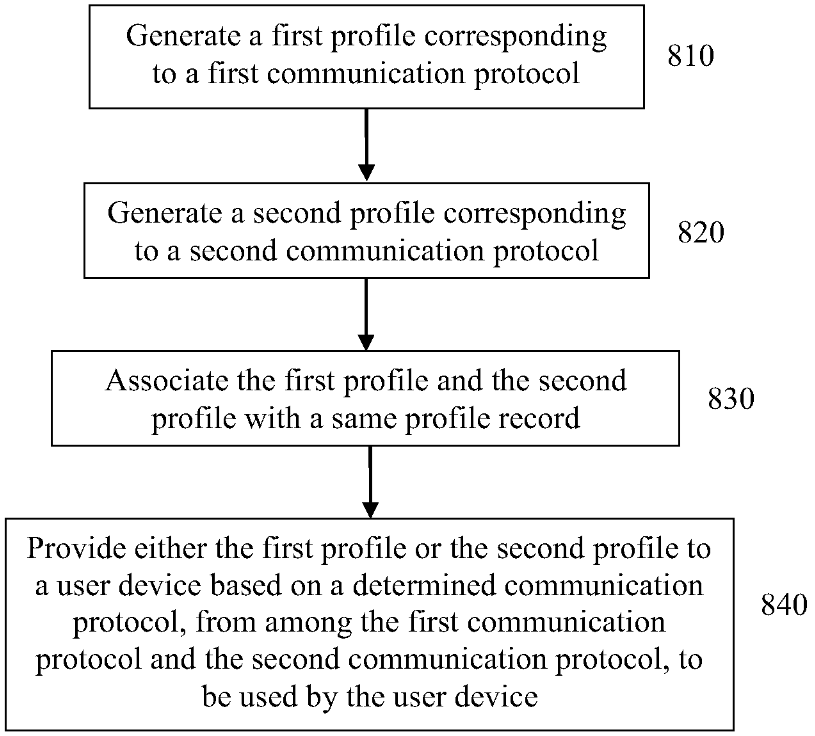
FIG. 8 illustrates a flowchart of a method for providing a network profile for an Embedded Universal Integrated Circuit Card (eUICC), in accordance with one or more example embodiments.

FIG. 8 illustrates a flowchart of a method for providing a network profile for an Embedded Universal Integrated Circuit Card (eUICC), in accordance with one or more example embodiments. Referring to FIG. 8, at operation 810, a first profile corresponding to a first communication protocol is generated. At operation 820, a second profile corresponding to a second communication protocol is generated. At operation 830, the first profile and the second profile are associated with a same profile record. At operation 840, either the first profile or the second profile are provided to a user device based on a determined communication protocol, from among the first communication protocol and the second communication protocol, to be used by the user device.

The various actions, acts, blocks, steps, or the like in the flow diagram 800 may be performed in the order presented, in a different order, or simultaneously. Further, in some embodiments, some of the actions, acts, blocks, steps, or the like may be omitted, added, modified, skipped, or the like without departing from the scope of the invention.

Figure 9:
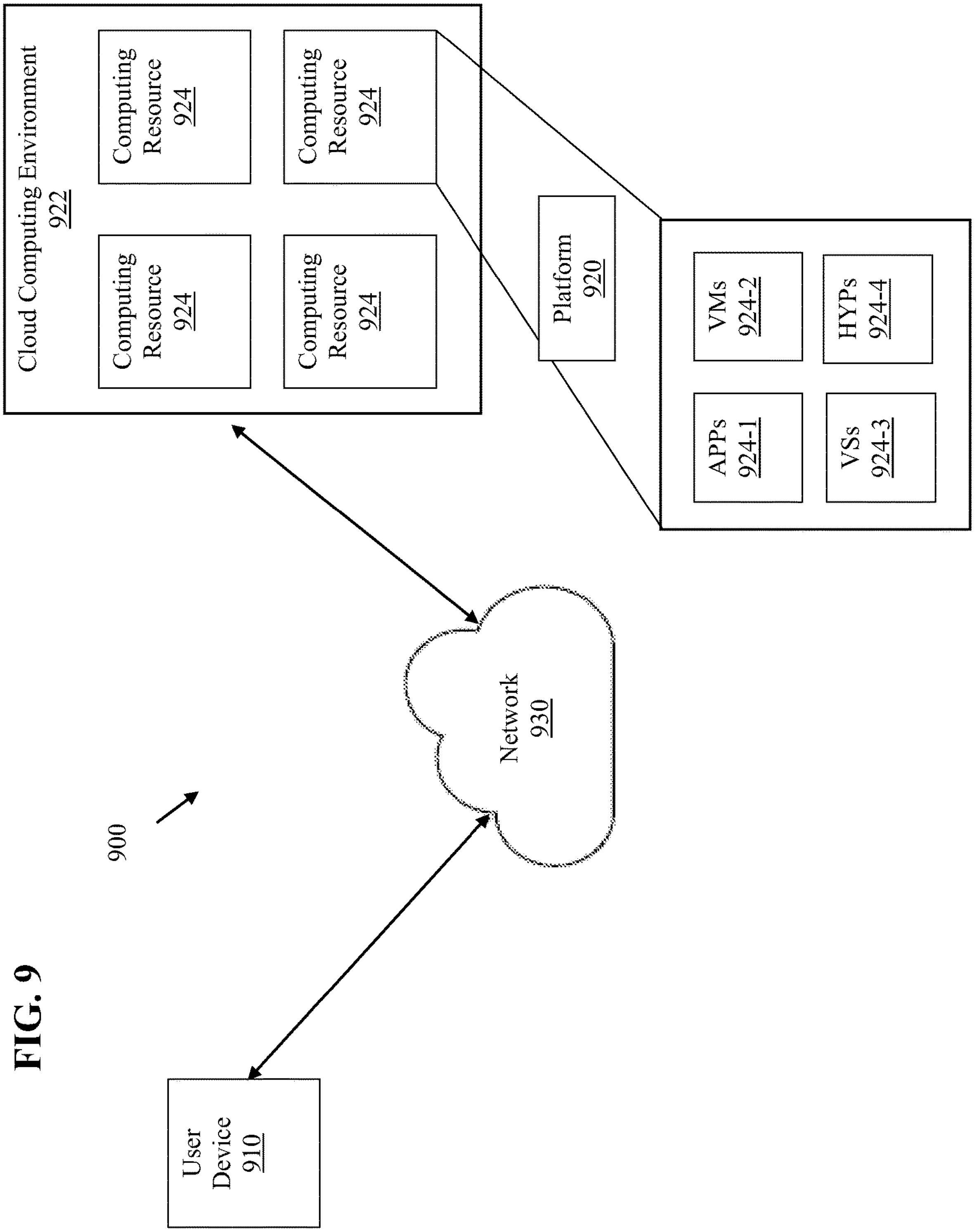
FIG. 9 is a diagram of an example environment in which systems and/or methods, described herein, may be implemented.

FIG. 9 is a diagram of an example environment 900 in which systems and/or methods, described herein, may be implemented. As shown in FIG. 9, environment 900 may include a user device 910, a platform 920, and a network 930. Devices of environment 900 may interconnect via wired connections, wireless connections, or a combination of wired and wireless connections. In embodiments, any of the functions and operations described with reference to FIGS. 1 through 3 above may be performed by any combination of elements illustrated in FIG. 9.

User device 910 includes one or more devices capable of receiving, generating, storing, processing, and/or providing information associated with platform 920. For example, user device 910 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 910 may receive information from and/or transmit information to platform 920.

Platform 920 includes one or more devices capable of receiving, generating, storing, processing, and/or providing information. In some implementations, platform 920 may include a cloud server or a group of cloud servers. In some implementations, platform 920 may be designed to be modular such that certain software components may be swapped in or out depending on a particular need. As such, platform 920 may be easily and/or quickly reconfigured for different uses.

In some implementations, as shown, platform 920 may be hosted in cloud computing environment 922. Notably, while implementations described herein describe platform 920 as being hosted in cloud computing environment 922, in some implementations, platform 920 may not be cloud-based (i.e., may be implemented outside of a cloud computing environment) or may be partially cloud-based.

Cloud computing environment 922 includes an environment that hosts platform 920. Cloud computing environment 922 may provide computation, software, data access, storage, etc., services that do not require end-user (e.g., user device 910) knowledge of a physical location and configuration of system(s) and/or device(s) that hosts platform 920. As shown, cloud computing environment 922 may include a group of computing resources 924 (referred to collectively as "computing resources 924" and individually as "computing resource 924").

Computing resource 924 includes one or more personal computers, a cluster of computing devices, workstation computers, server devices, or other types of computation and/or communication devices. In some implementations, computing resource 924 may host platform 920. The cloud resources may include compute instances executing in computing resource 924, storage devices provided in computing resource 924, data transfer devices provided by computing resource 924, etc. In some implementations, computing resource 924 may communicate with other computing resources 924 via wired connections, wireless connections, or a combination of wired and wireless connections.

As further shown in FIG. 9, computing resource 924 includes a group of cloud resources, such as one or more applications ("APPs") 924-1, one or more virtual machines ("VMs") 924-2, virtualized storage ("VSs") 924-3, one or more hypervisors ("HYPs") 924-4, or the like.

Application 924-1 includes one or more software applications that may be provided to or accessed by user device 910. Application 924-1 may eliminate a need to install and execute the software applications on user device 910. For example, application 924-1 may include software associated with platform 920 and/or any other software capable of being provided via cloud computing environment 922. In some implementations, one application 924-1 may send/receive information to/from one or more other applications 924-1, via virtual machine 924-2.

Virtual machine 924-2 includes a software implementation of a machine (e.g., a computer) that executes programs like a physical machine. Virtual machine 924-2 may be either a system virtual machine or a process virtual machine, depending upon use and degree of correspondence to any real machine by virtual machine 924-2. A system virtual machine may provide a complete system platform that supports execution of a complete operating system ("OS"). A process virtual machine may execute a single program, and may support a single process. In some implementations, virtual machine 924-2 may execute on behalf of a user (e.g., user device 910), and may manage infrastructure of cloud computing environment 922, such as data management, synchronization, or long-duration data transfers.

Virtualized storage 924-3 includes one or more storage systems and/or one or more devices that use virtualization techniques within the storage systems or devices of computing resource 924. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 924-4 may provide hardware virtualization techniques that allow multiple operating systems (e.g., "guest operating systems") to execute concurrently on a host computer, such as computing resource 924. Hypervisor 924-4 may present a virtual operating platform to the guest operating systems, and may manage the execution of the guest operating systems. Multiple instances of a variety of operating systems may share virtualized hardware resources.

Network 930 includes one or more wired and/or wireless networks. For example, network 930 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 9 are provided as an example. In practice, there may be additional devices and/or networks, fewer devices and/or networks, different devices and/or networks, or differently arranged devices and/or networks than those shown in FIG. 9. Furthermore, two or more devices shown in FIG. 9 may be implemented within a single device, or a single device shown in FIG. 9 may be implemented as multiple, distributed devices. Additionally, or alternatively, a set of devices (e.g., one or more devices) of environment 900 may perform one or more functions described as being performed by another set of devices of environment 900.

Figure 10:
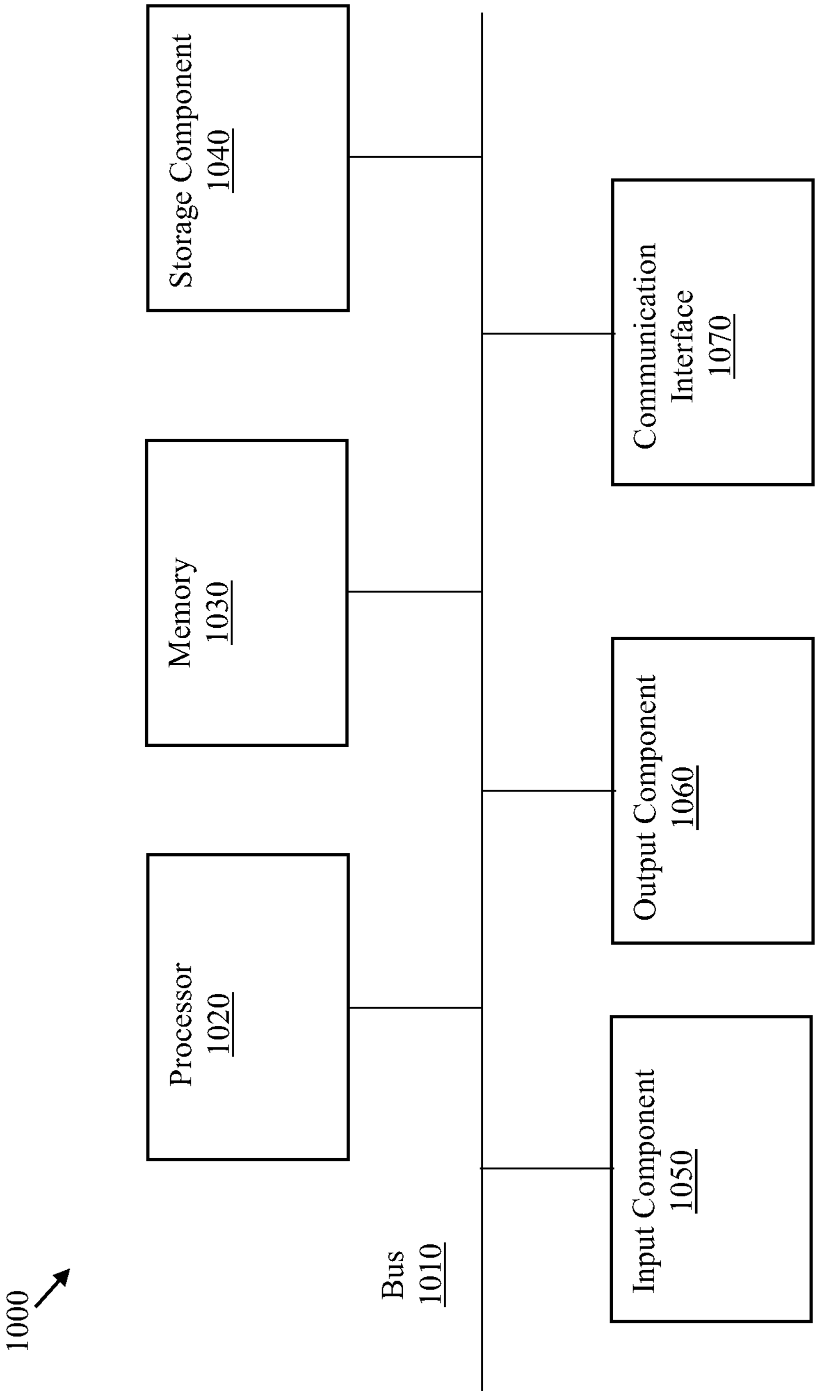
FIG. 10 illustrates a diagram of components of one or more devices, in accordance with one or more example embodiments.

FIG. 10 is a diagram of example components of a device 1000. Device 1000 may correspond to user device 910 and/or platform 920. As shown in FIG. 10, device 1000 may include a bus 1010, a processor 1020, a memory 1030, a storage component 1040, an input component 1050, an output component 1060, and a communication interface 1070.

Bus 1010 includes a component that permits communication among the components of device 1000. Processor 1020 may be implemented in hardware, firmware, or a combination of hardware and software. Processor 1020 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1020 includes one or more processors capable of being programmed to perform a function. Memory 1030 includes a random access memory (RAM), a read only memory (ROM), and/or another type of dynamic or static storage device (e.g., a flash memory, a magnetic memory, and/or an optical memory) that stores information and/or instructions for use by processor 1020.

Storage component 1040 stores information and/or software related to the operation and use of device 1000. For example, storage component 1040 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 1050 includes a component that permits device 1000 to receive information, such as via user input (e.g., a touch screen display, a keyboard, a keypad, a mouse, a button, a switch, and/or a microphone). Additionally, or alternatively, input component 1050 may include a sensor for sensing information (e.g., a global positioning system (GPS) component, an accelerometer, a gyroscope, and/or an actuator). Output component 1060 includes a component that provides output information from device 1000 (e.g., a display, a speaker, and/or one or more light-emitting diodes (LEDs)).

Communication interface 1070 includes a transceiver-like component (e.g., a transceiver and/or a separate receiver and transmitter) that enables device 1000 to communicate with other devices, such as via a wired connection, a wireless connection, or a combination of wired and wireless connections. Communication interface 1070 may permit device 1000 to receive information from another device and/or provide information to another device. For example, communication interface 1070 may include an Ethernet interface, an optical interface, a coaxial interface, an infrared interface, a radio frequency (RF) interface, a universal serial bus (USB) interface, a Wi-Fi interface, a cellular network interface, or the like.

Device 1000 may perform one or more processes described herein. Device 1000 may perform these processes in response to processor 1020 executing software instructions stored by a non-transitory computer-readable medium, such as memory 1030 and/or storage component 1040. A computer-readable medium is defined herein as a non-transitory memory device. A memory device includes memory space within a single physical storage device or memory space spread across multiple physical storage devices.

Software instructions may be read into memory 1030 and/or storage component 1040 from another computer-readable medium or from another device via communication interface 1070. When executed, software instructions stored in memory 1030 and/or storage component 1040 may cause processor 1020 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 10 are provided as an example. In practice, device 1000 may include additional components, fewer components, different components, or differently arranged components than those shown in FIG. 10. Additionally, or alternatively, a set of components (e.g., one or more components) of device 1000 may perform one or more functions described as being performed by another set of components of device 1000.

In embodiments, any one of the operations or processes of FIGS. 1 through 8 may be implemented by or using any one of the elements illustrated in FIGS. 9 and 10.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of providing a network profile for an Embedded Universal Integrated Circuit Card (eUICC), the method comprising:

storing, in a server, profile records corresponding to each of users;

generating, for a first user that is one of the users, a first profile corresponding to a first communication protocol;

generating, for the first user, a second profile corresponding to a second communication protocol;

incorporating the first profile and the second profile into a profile record for the first user among the profile records; and in response to a request for downloading a profile of the first user, providing, from the server, an enabled profile among the first profile and the second profile contained in the profile record for the first user, to a user device based on a determined communication protocol to be used by the user device, wherein the first profile and the second profile are eUICC profiles, wherein storage of the profile record in which the first profile and the second profile are incorporated is maintained in the server after providing the enabled profile to the user device and while the enabled profile is used by the user device, and wherein the generating the second profile comprises altering a copy of the first profile.

2. The method of claim 1, wherein the incorporating the first profile and the second profile into the profile record comprises:

associating the first profile and the second profile with a same eUICC identification number in the profile record for the first user.

3. The method of claim 1, wherein the incorporating the first profile and the second profile into the profile record comprises:

associating the first profile and the second profile with a same mobile telephone number in the profile record for the first user.

4. The method of claim 1, wherein the incorporating the first profile and the second profile into the profile record comprises:

associating the first profile and the second profile with a same Mobile Station International Subscriber Directory Number (MSISDN) and a same international mobile subscriber identity number in the profile record for the first user.

5. The method of claim 1, wherein the first communication protocol is associated with one generation of wireless technology and the second communication protocol is associated with another generation of wireless technology.

6. The method of claim 1, wherein the altering the copy of the first profile comprises making a copy of the generated first profile, and altering the made copy of the generated first profile.

7. The method of claim 6, wherein the altering the made copy of the generated first profile comprises deleting one or more files in a file system of the first profile that are specific to the first communication protocol or adding one or more to the file system of the first profile that are specific to the second communication protocol.

8. The method of claim 1, further comprising:

receiving user device information from the user device; and determining whether to provide, to the user device, the first profile or the second profile based on the received user device information.

9. The method of claim 8, wherein the receiving the user device information comprises receiving the user device information based on a quick response code or other machine-readable code provided to and scanned by the user device.

10. A system for providing a network profile for an Embedded Universal Integrated Circuit Card (eUICC), the system comprising:

a memory storing instructions; and at least one processor configured to execute the instructions to:

store, in a server, profile records corresponding to each of users;

generate, for a first user that is one of the users, a first profile corresponding to a first communication protocol;

generate, for the first user, a second profile corresponding to a second communication protocol;

incorporate the first profile and the second profile into a profile record for the first user among the profile records; and in response to a request for downloading a profile of the first user, provide, from the server, an enabled profile among the first profile and the second profile contained in the profile record for the first user, to a user device based on a determined communication protocol to be used by the user device, wherein the first profile and the second profile are eUICC profiles, wherein storage of the profile record in which the first profile and the second profile are incorporated is maintained in the server after providing the enabled profile to the user device and while the enabled profile is used by the user device, and wherein the at least one processor is further configured to execute the instructions to generate the second profile by altering a copy of the first profile.

11. The system of claim 10, wherein the at least one processor is further configured to execute the instructions to:

associate the first profile and the second profile with a same eUICC identification number in the profile record for the first user.

12. The system of claim 11, wherein the at least one processor is further configured to execute the instructions to:

associate the first profile and the second profile with a same mobile telephone number in the profile record for the first user.

13. The system of claim 10, wherein the at least one processor is further configured to execute the instructions to:

associate the first profile and the second profile with a same Mobile Station International Subscriber Directory Number (MSISDN) and a same international mobile subscriber identity number in the profile record for the first user.

14. The system of claim 10, wherein the first communication protocol is associated with one generation of wireless technology and the second communication protocol is associated with another generation of wireless technology.

15. The system of claim 10, wherein the at least one processor is further configured to execute the instructions to alter the copy of the first profile by making a copy of the generated first profile, and altering the made copy of the generated first profile.

16. The system of claim 15, wherein the at least one processor is configured to execute the instructions to alter the made copy of the generated first profile by deleting one or more files in a file system of the first profile that are specific to the first communication protocol or adding one or more to the file system of the first profile that are specific to the second communication protocol.

17. The system of claim 10, wherein the at least one processor is further configured to execute the instructions to:

receive user device information from the user device; and determine whether to provide, to the user device, the first profile or the second profile based on the received user device information.

18. The system of claim 17, wherein the at least one processor is further configured to execute the instructions to:

receive the user device information based on a quick response code or other machine-readable code provided to and scanned by the user device.

19. A non-transitory computer-readable medium for storing computer readable program code or instructions for carrying out operations, when executed by a processor, for providing a network profile for an Embedded Universal Integrated Circuit Card (eUICC), the operations comprising:

storing, in a server, profile records corresponding to each of users;

generating, for a first user that is one of the users, a first profile corresponding to a first communication protocol;

generating, for the first user, a second profile corresponding to a second communication protocol;

incorporating the first profile and the second profile into a profile record for the first user among the profile records; and in response to a request for downloading a profile of the first user, providing, from the server, an enabled profile among the first profile and the second profile contained in the profile record for the first user, to a user device based on a determined communication protocol to be used by the user device, wherein the first profile and the second profile are eUICC profiles, wherein storage of the profile record in which the first profile and the second profile are incorporated is maintained in the server after providing the enabled profile to the user device and while the enabled profile is used by the user device, and wherein the generating the second profile comprises altering a copy of the first profile.

20. The non-transitory computer-readable medium of claim 19, wherein the incorporating the first profile and the second profile into the profile record comprises associating the first profile and the second profile with a same eUICC identification number in the profile record of the first user.

* * * * *